United States Patent
Won et al.

(10) Patent No.: US 8,559,054 B2
(45) Date of Patent: Oct. 15, 2013

(54) COLOR CONVERSION METHOD BASED ON ERROR CORRECTION TABLE

(75) Inventors: Seok-Jin Won, Seongnam-si (KR);
Sung-Dae Cho, Yongin-si (KR);
Young-Min Jeong, Suwon-si (KR);
Yun-Je Oh, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1142 days.

(21) Appl. No.: 11/635,114

(22) Filed: Dec. 7, 2006

(65) Prior Publication Data
US 2007/0171445 A1  Jul. 26, 2007

(30) Foreign Application Priority Data
Jan. 24, 2006  (KR) .................. 10-2006-0007438

(51) Int. Cl.
| | |
|---|---|
| H04N 1/60 | (2006.01) |
| H04N 1/54 | (2006.01) |
| H04N 1/56 | (2006.01) |
| H04N 1/58 | (2006.01) |
| H04N 1/46 | (2006.01) |
| G03F 3/10 | (2006.01) |
| G09G 5/06 | (2006.01) |

(52) U.S. Cl.
USPC ............ 358/1.9; 358/501; 358/515; 358/518; 358/523; 358/524; 358/525; 345/600; 345/601; 345/602; 345/603; 345/604; 345/605; 345/606

(58) Field of Classification Search
USPC .......... 358/1.9, 501, 515, 518, 523, 524, 525; 345/590–605
See application file for complete search history.

(56) References Cited

U.S. PATENT DOCUMENTS

| | | | | | |
|---|---|---|---|---|---|
| 4,749,983 | A | * | 6/1988 | Langdon, Jr. .................. | 341/51 |
| 5,065,234 | A | * | 11/1991 | Hung et al. .................... | 358/523 |
| 5,307,088 | A | * | 4/1994 | Inuzuka et al. ............... | 345/600 |
| 5,321,797 | A | * | 6/1994 | Morton ......................... | 345/604 |
| 5,481,380 | A | * | 1/1996 | Bestmann ..................... | 358/504 |
| 5,739,927 | A | * | 4/1998 | Balasubramanian et al. | 358/518 |
| 5,982,949 | A | * | 11/1999 | Ohtsuka ........................ | 382/276 |
| 6,049,399 | A | * | 4/2000 | Shyu ............................. | 358/520 |
| 6,330,075 | B1 | * | 12/2001 | Ishikawa ........................ | 358/1.9 |
| 6,724,935 | B1 | * | 4/2004 | Sawada et al. ................ | 382/167 |
| 6,781,596 | B2 | * | 8/2004 | Falk ............................... | 345/600 |
| 6,809,837 | B1 | * | 10/2004 | Mestha et al. ................. | 358/1.9 |
| 6,909,811 | B1 | * | 6/2005 | Kajiwara et al. .............. | 382/246 |
| 7,336,392 | B2 | * | 2/2008 | Kakutani ....................... | 358/1.9 |
| 2002/0196264 | A1 | * | 12/2002 | Goetz ........................... | 345/611 |
| 2002/0196484 | A1 | * | 12/2002 | Chang ........................... | 358/534 |

(Continued)

FOREIGN PATENT DOCUMENTS

| | | |
|---|---|---|
| JP | 10-200770 | 7/1998 |
| JP | 2000-324348 | 11/2000 |

(Continued)

*Primary Examiner* — King Poon
*Assistant Examiner* — Beniyam Menberu
(74) *Attorney, Agent, or Firm* — Cha & Reiter, LLC

(57) ABSTRACT

Disclosed is a color conversion method, the method including the steps of (a) converting a color using an approximation technique, and (b) correcting an error of the color using a preset error correction table containing information regarding a difference between a color channel based on an original conversion formula and a color channel based on the approximation technique.

5 Claims, 9 Drawing Sheets

(56) References Cited

U.S. PATENT DOCUMENTS

| | | | |
|---|---|---|---|
| 2003/0063084 A1* | 4/2003 | Burke | 345/419 |
| 2003/0067616 A1* | 4/2003 | Toyoda et al. | 358/1.9 |
| 2003/0090726 A1* | 5/2003 | Arai | 358/2.1 |
| 2003/0185441 A1* | 10/2003 | Nagae | 382/167 |
| 2004/0017595 A1* | 1/2004 | Ikeda | 358/518 |
| 2004/0061902 A1* | 4/2004 | Tang et al. | 358/3.01 |
| 2004/0169659 A1* | 9/2004 | Kagawa et al. | 345/600 |
| 2004/0218233 A1* | 11/2004 | Edge | 358/504 |
| 2006/0262224 A1* | 11/2006 | Ha et al. | 348/582 |
| 2007/0002380 A1* | 1/2007 | Metcalfe et al. | 358/3.03 |
| 2007/0216812 A1* | 9/2007 | Shimizu | 348/624 |
| 2011/0267629 A1* | 11/2011 | Fan et al. | 358/1.9 |

FOREIGN PATENT DOCUMENTS

| | | |
|---|---|---|
| JP | 2003-219191 | 7/2003 |
| JP | 2005-249820 | 9/2005 |
| JP | 2005-249821 | 9/2005 |
| KR | 2002-41698 | 6/2002 |

* cited by examiner

| R | G | B | | L | a | b |
|---|---|---|---|---|---|---|
| 73 | 29 | 28 | | 30 | 29 | 11 |
| 52 | 39 | 32 | | 31 | 8 | 10 |
| 103 | 101 | 85 | | 51 | 2 | 14 |
| 67 | 73 | 53 | | 41 | -5 | 12 |
| 35 | 43 | 24 | | 30 | -7 | 9 |
| 27 | 48 | 33 | | 30 | -19 | 8 |
| 28 | 44 | 43 | | 30 | -19 | -2 |
| 33 | 40 | 47 | | 30 | -6 | -8 |
| 23 | 20 | 42 | ⇔ | 25 | 2 | -19 |
| 42 | 26 | 36 | | 30 | 12 | -1 |
| 128 | 52 | 60 | | 42 | 56 | 17 |
| 88 | 70 | 51 | | 40 | 16 | 17 |
| 77 | 77 | 46 | | 41 | 4 | 23 |
| 90 | 107 | 73 | | 51 | -13 | 24 |
| 60 | 86 | 56 | | 40 | -20 | 15 |
| 44 | 87 | 56 | | 40 | -33 | 14 |
| 51 | 77 | 71 | | 40 | -22 | -1 |
| 32 | 39 | 60 | | 30 | -2 | -18 |
| 29 | 38 | 71 | | 30 | 0 | -27 |
| 55 | 27 | 39 | | 31 | 21 | -4 |

COLOR CONVERSION METHOD BASED ON ERROR CORRECTION TABLE

CLAIM OF PRIORITY

This application claims priority to an application entitled "Color Conversion Method Based on Error Correction Table" filed with the Korean Intellectual Property Office on Jan. 24, 2006 and assigned Serial No. 2006-7438, the contents of which are incorporated herein by reference.

BACKGROUND OF THE INVENTION

1. Field of the Invention

The present invention relates to a method for converting colors using an error correction table (e.g. color lookup table) so that colors are created and displayed/outputted by a suitable display/output device.

2. Description of the Related Art

As generally known in the art, color regeneration apparatuses including scanners, printers, monitors, and recently-developed mobile LCDs are evolving. These devices are moving towards multi-functionality, high quality, and low price, in order to satisfy various user demands. Color regeneration apparatuses use different color spaces or color models according to their field of application. For example, a Red-Green-Blue (RGB) color space is used for computer monitors, and a Cyan-Magenta-Yellow-Black (CMYK) color space is used for printing purpose. In addition, a Commission Internationale de l'Eclairage (CIE) color space is used to define so-called apparatus-independent colors, i.e. which can be accurately regenerated by any apparatus. CIE color spaces may be classified into CIE-XYZ, CIE L*a*b*, and CIE LUV color spaces. CIE color spaces can be easily used in computer environments so as to express a wide range of colors. For these reasons, they are extensively used in the art.

The RGB color model is commonly used to express colors in the case of digital imaging. However, the RBG color model is not apparatus-independent and renders accurate color correction difficult. Therefore, a color conversion process is usually performed to convert the RGB color model into a CIE L*a*b* color model.

Conventional color conversion techniques use a simple type of approximation, such as interpolation based on a Color LookUp Table (CLUT) or polynomial regression equation. This is to reduce the storage space necessary for conversion and improving the conversion performance. Referring to FIG. 1, the CLUT-based interpolation is one of the most widely used color conversion techniques. In operation the CLUT-based interpolation samples and stores some colors in a CLUT format during conversion of the entire color space. The remaining colors (i.e. colors which have not been stored in a table) are converted in any interpolation mode (e.g. tetrahedral interpolation, tri-linear). For the polynomial regression equation, the original conversion formula, which is complicated, is approximated into a simple type of polynomial equation to be used for color conversion. For example, the polynomials can be as defined by Table 1 below.

TABLE 1

Table 3.1 The Polynomials for Color Space Conversion

1. $P(x, y, z) = a_1 x + a_2 y + a_3 z$
2. $P(x, y, z) = a_0 + a_1 x + a_2 y + a_3 z$

TABLE 1-continued

Table 3.1 The Polynomials for Color Space Conversion

3. $P(x, y, z) = a_1 x + a_2 y + a_3 z + a_4 xy + a_5 yz + a_6 zx$
4. $P(x, y, z) = a_0 + a_1 x + a_2 y + a_3 z + a_4 xy + a_5 yz + a_6 zx + a_{18} xyz$
5. $P(x, y, z) = a_1 x + a_2 y + a_3 z + a_4 xy + a_5 yz + a_6 zx + a_7 x^2 + a_8 y^3 + a_9 z^3$
6. $P(x, y, z) = a_0 + a_1 x + a_2 y + a_3 z + a_4 xy + a_5 yz + a_6 zx + a_7 x^2 + a_8 y^3 + a_9 z^3 + a_{10} xyz$
7. $P(x, y, z) = a_0 + a_1 x + a_2 y + a_3 z + a_4 xy + a_5 yz + a_6 zx + a_7 x^2 + a_8 y^3 + a_9 z^3 + a_{10} xyz + a_{11} x^3 + a_{12} y^3 + a_{13} z^3$
8. $P(x, y, z) = a_0 + a_1 x + a_2 y + a_3 z + a_4 xy + a_5 yz + a_6 zx + a_7 x^3 + a_8 y^2 + a_9 z^2 + a_{10} xyz + a_{11} x^3 + a_{12} y^3 + a_{13} z^3 + a_{14} xy^2 + a_{15} x^2 y + a_{16} yz^2 + a_{17} y^2 z + a_{18} zx^2 + a_{19} z^2 x$ In general, the CLUT-based interpolation requires a large storage space, but it is accurate and fast. In contrast, the polynomial regression requires a small storage space, but it is inaccurate and slow.

Meanwhile, a mapping table may be used for the entire color space conversion. For example, in a 24 bit color format, which is generally used in the industry, the mapping table requires a memory of $2^{24} \times 3 = 48M$ byte. This size is too large to be implemented. However, in a 16 bit color format, the necessary memory is $2^{16} \times 2 = 128K$ byte, which can be implemented easily.

In summary, conventional color conversion methods using a simple approximation technique (e.g. CLUT-based interpolation, polynomial regression equation) have a larger error when compared with the original conversion formula, which is complicated. Therefore, it is necessary to reduce the error occurring in the conventional methods.

SUMMARY OF THE INVENTION

The present invention has been made to reduce or overcome the above-mentioned problems occurring in the prior art. An object of the present invention is to provide a color conversion method using an error correction table, which reduces the conversion error while using a small storage space.

According to the principles of the present invention a color conversion method is provided using on an error correction table, the method including the steps of (a) converting a color using an approximation technique and (b) correcting an error of the color using a preset error correction table containing information regarding a difference between a color channel based on an original conversion formula and a color channel based on the approximation technique.

Preferably, the error correction table includes values for each color channel of a color space (to be converted). The error correction values are obtained from the difference between a color channel based on an original conversion formula and a color channel based on the approximation technique. The error correction values are stored in fields for storing a code and an error displacement value.

BRIEF DESCRIPTION OF THE DRAWINGS

The present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein is omitted to avoid making the subject matter of the present invention unclear.

Figure 1:
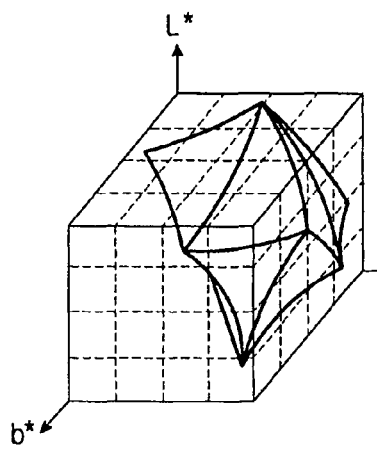
FIG. 1 shows a color conversion method based on a color lookup table according to the prior art.
Figure 2:
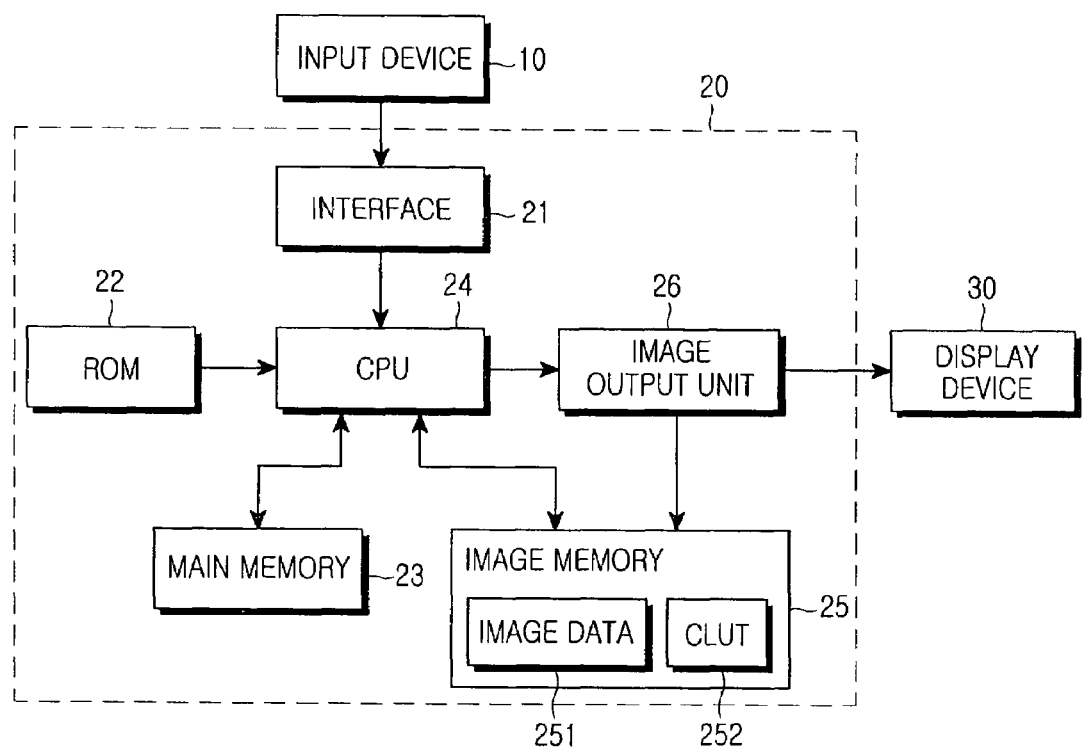
FIG. 2 is a block diagram showing an example of a color conversion apparatus to implement a color conversion method using an error correction table according to the present invention.

FIG. 2 is a block diagram showing an example of a color conversion apparatus to implement a color conversion method using an error correction table according to the present invention. As shown, the apparatus includes an input device 10, an image processing device 20, and a display device 30. The input device 10 creates image data and transmits it to the image processing device 20. The image processing device 20 subjects the transmitted image data to color conversion, correction, etc. so that it can be displayed by the display device 30. After such processing, the data is outputted to the display device 30.

The image processing device 20 includes an interface 21, a ROM 22, a main memory 23, an image memory 25, a CPU 24, and an image processing unit 26.

When the interface 21 performs interfacing with the input device 10, the CPU 24 obtains image data from the input device 10 via the interface 21 and temporarily stores the data in the main memory 23. The ROM 22 pre-stores a program necessary for various operations of the CPU 24, including image processing. The CPU 24 controls the overall operation of the image processing device 20. In particular, the CPU 24 stores image data, which has been temporarily stored in the main memory 23, in the image memory 25 after suitable processing. The image output unit 26 creates video signals by subjecting the image data to signal conversion and outputs them to the display device 30.

The image memory 25 has an image data region 251 to store image data, as well as a CLUT region 252. The CPU 24 performs the necessary color conversion operations based on the color information from a CLUT in the CLUT region 252, which is referred to by the image data in the image data region 251.

Figure 3:
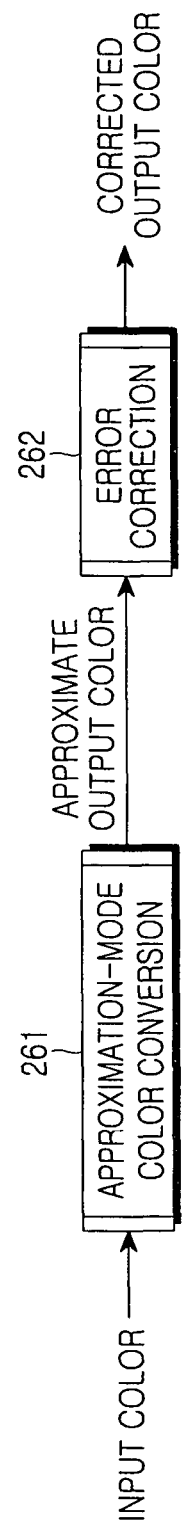
FIG. 3 is a flowchart showing an overall color conversion process using an error correction table according to the present invention.

FIG. 3 is a flowchart showing an overall color conversion process using an error correction table according to the present invention. The color conversion process is divided into two steps. In step 261, a conventional approximation technique (e.g. CLUT-based interpolation or polynomial regression equation) is used to convert colors. In step 262, error correction is performed according to the present invention, which reduces the error of converted colors.

Figure 4:
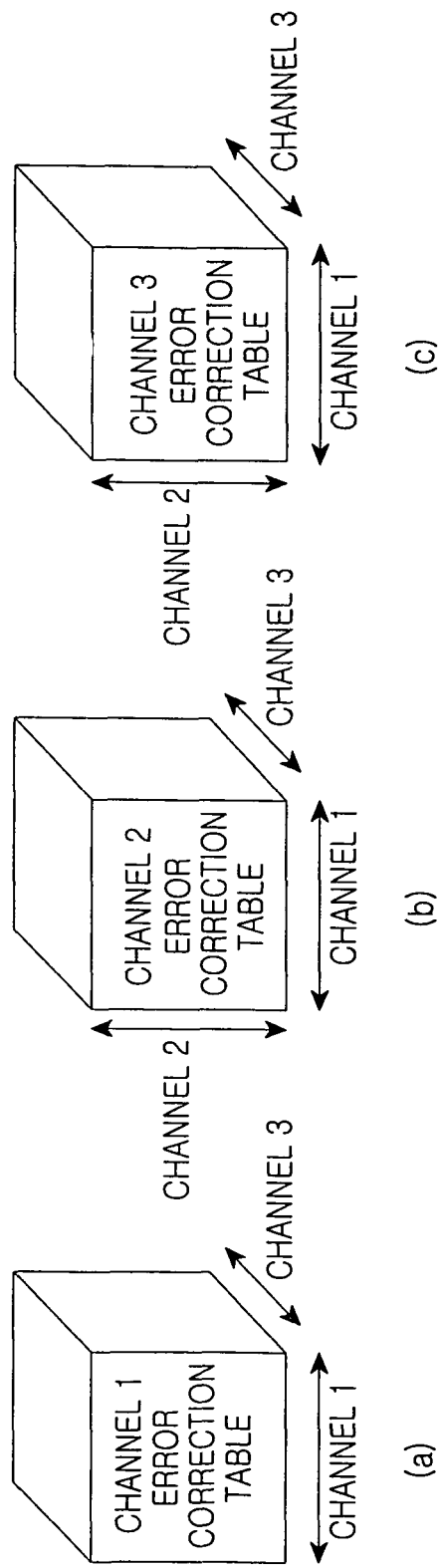
FIG. 4 shows an example of an RGB error correction table for a color conversion operation using an error correction table according to the present invention.
Figure 5:
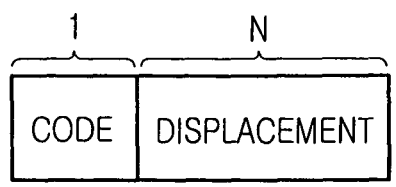
FIG. 5 shows an example of a format of an error correction value for a color conversion operation using an error correction table according to the present invention.

As shown in FIG. 4, in the error correction step, an error correction table is used for each color channel (e.g. R, G, B). Each table stores error correction values regarding the entire color space that is converted. A displacement bit number is added to the table as field information. Each error correction value is obtained from a difference between a color channel based on an original conversion formula and that based on an approximation technique. As shown in FIG. 5, the value is then separately stored in code and displacement fields.

An exemplary conversion algorithm for obtaining error correction values is provided below. Other conversion algorithms may be used. In the algorithm, CH1 refers to a current color channel value obtained from an original conversion formula, and CH2 refers to a color channel value obtained from an approximation technique.

Conversion algorithm

```
If (CH1 >= CH2)
   code = 0
   displacement = CH1 - CH2
else
   code = 1
   displacement = CH2 - CH1
```

Figure 6:
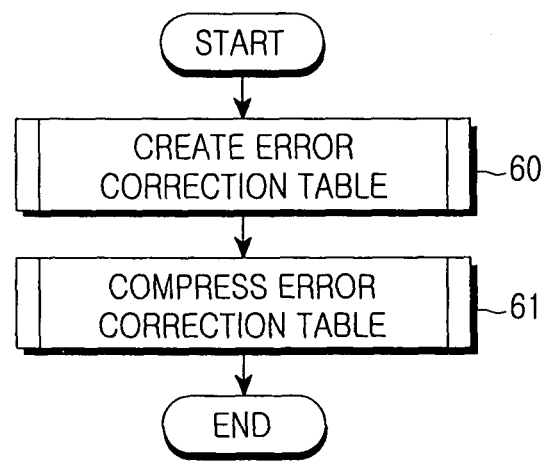
FIG. 6 is a flowchart showing an overall process for creating an error correction table during a color conversion operation using an error correction table according to the present invention.

FIG. 6 is a flowchart showing an overall process for creating an error correction table during a color conversion operation using an error correction table according to the present invention. The process for creating an error correction table includes two steps. In step 60, an error correction value is obtained for each channel from a difference between a color channel based on an original conversion formula and that based on an approximation technique. A corresponding error correction table is created. In step 61, the created error correction table is properly compressed.

Figure 7:
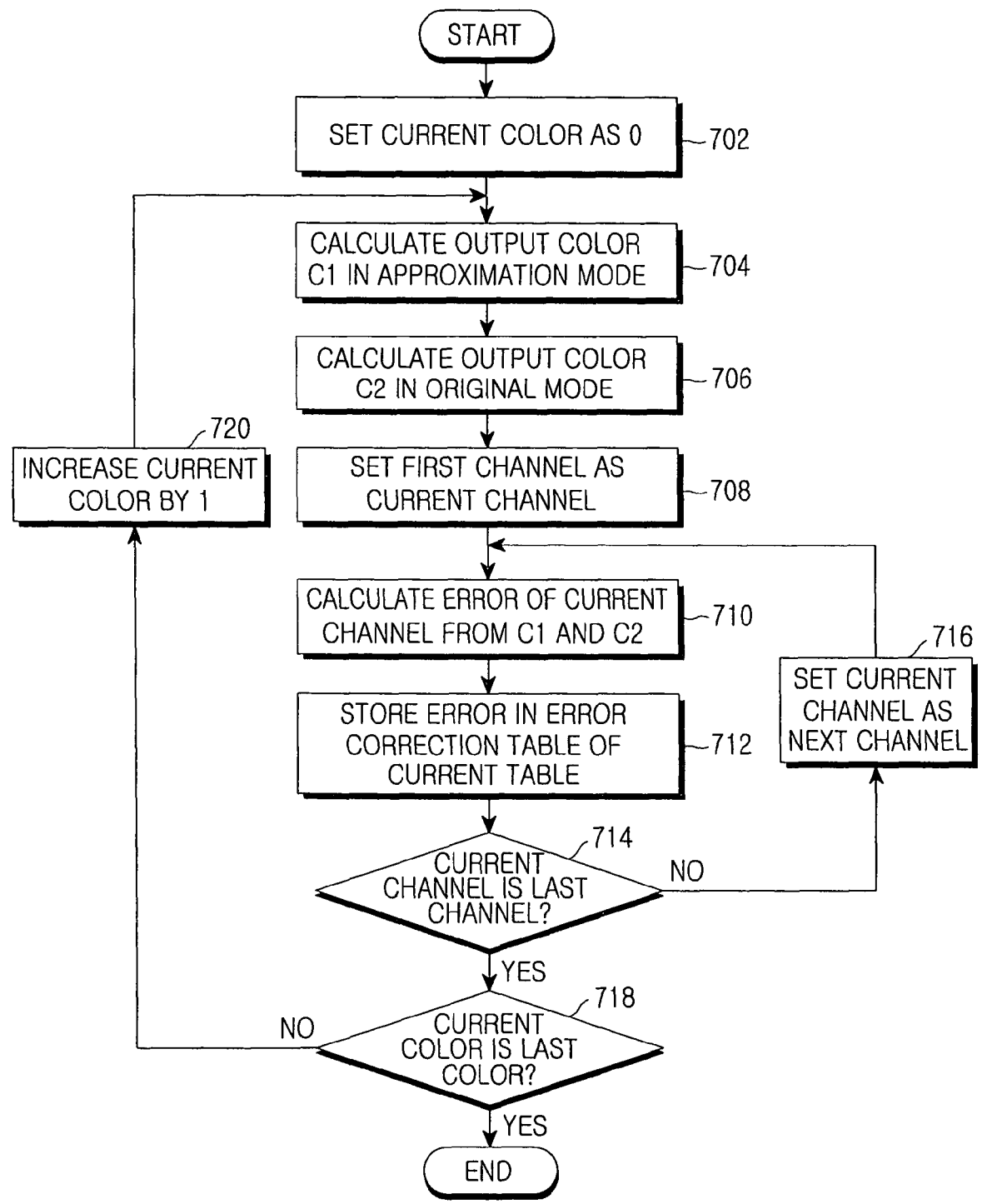
FIG. 7 is a flowchart showing detailed steps for creating an error correction table during the process shown in FIG. 6.

FIG. 7 is a flowchart showing detailed steps for creating an error correction table using a conversion algorithm during the process shown in FIG. 6. Referring to FIG. 7, the current color is set as a zero-numbered color in step 702. An output color C1 is calculated in an approximation mode in step 704. An output color C2 is calculated in the original mode in step 706. The first channel is set as the current channel in step 708. The error of the current channel is calculated from C1 and C2 in step 710. The error value is successively stored in the error correction table of the current channel in step 712. A checked is performed to determine whether the current channel is the last channel in step 714. If not, the current channel is set as the next channel in step 716. Then, the steps for calculating the error of the current channel from C1 and C2 is repeated from step 710. If it is determined that the current channel is the last channel in step 714, then a checked is performed to determine whether the current color is the last color in step 718. If so, the process is terminated. If not, the number of the current color is increased by 1 in step 720, and the steps starting from step 704 are repeated.

Assuming that the output color based on the approximation mode is C1, the output color based on the original conversion formula is C2, the current channel value of C1 is CH1, and the current channel value of C2 is CH2 in the steps for creating an error correction table shown in FIG. 7, an error value E is defined as CH2-CH1 and stored. When the error value E is a negative number, the code bit is stored as 1 and, when the error value E is a positive number or zero, the code bit is stored as 0. The absolute value of the error value E is stored as the displacement value.

Figure 8:
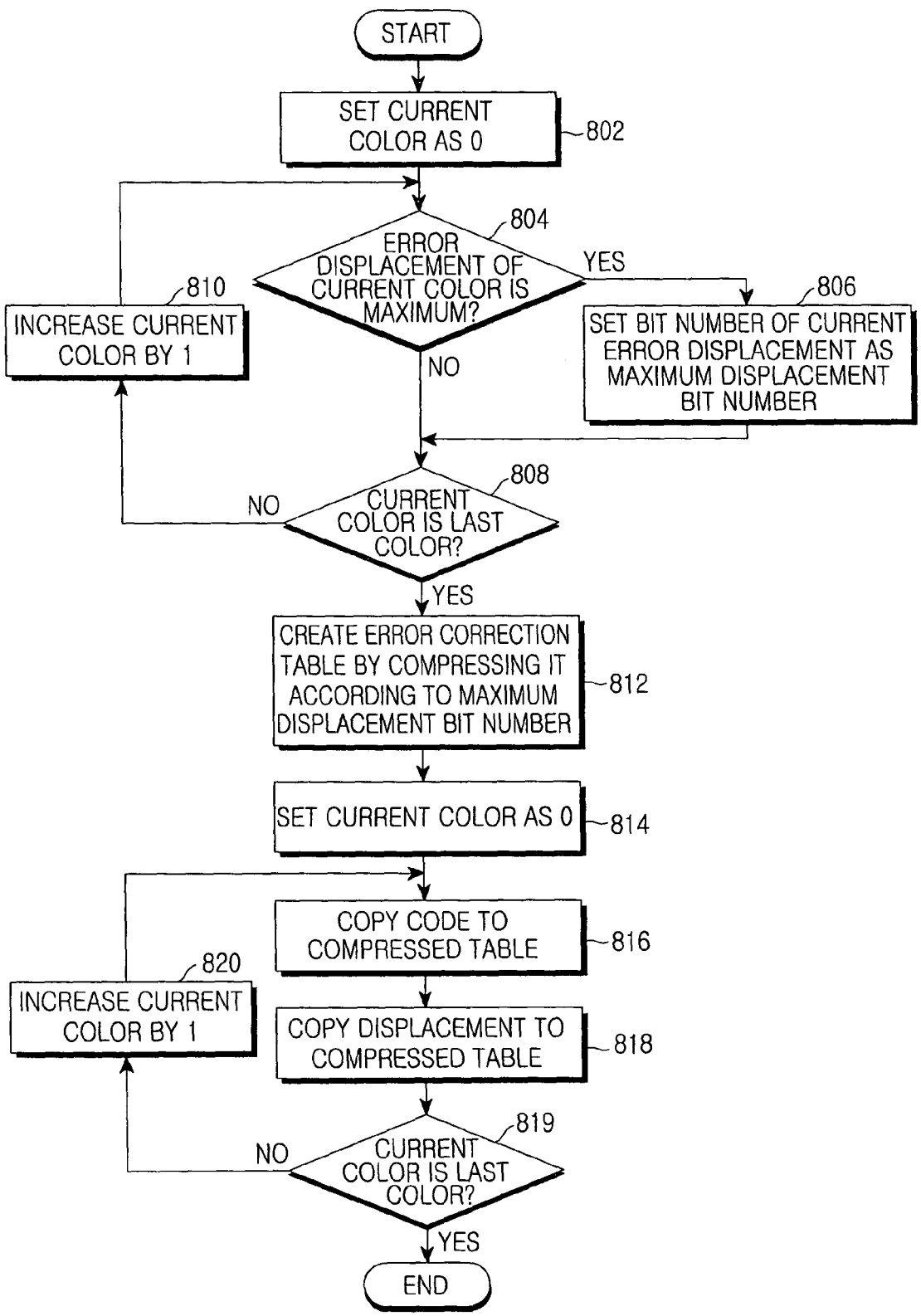
FIG. 8 is a flowchart showing detailed steps for compressing an error correction table during the process shown in FIG. 6.

FIG. 8 is a flowchart showing detailed steps for compressing an error correction table during the process shown in FIG. 6. Referring to FIG. 8, the current color is set as a zero-numbered color in step 802. The error displacement of the current color is compared with a maximum displacement bit number (currently, there is no stored value) in step 804 so as to confirm if the error displacement is the maximum. If so, the flow is directed to step 806; if not, the flow is directed to step 808. In step 806, the bit number of the current error displacement is set as the maximum displacement bit number. Then, in step 808, it is checked if the current color is the last color. If not, the number of the current color is increased by 1 in step 810, and the steps starting from step 804 are repeated. If the current color is the last color, step 812 is conducted.

In step 812, an error correction table is created by compressing it according to the maximum displacement bit number. In step 814, the current color is set as a zero-numbered color. In step 816, the code of the current color is copied to the compressed correction table. In step 819, a checked is performed to determine whether the current color is the last color. If so, the process is terminated. If not, the number of the current color is increased by 1 in step 820, and the steps starting from step 816 are repeated.

The steps for creating and compressing an error correction table shown in FIGS. 7 and 8 will now be described in more detail. As shown in FIG. 7, a primary error correction table is created. The size of a field is the sum of the bit number occupied by the current channel in the input color and 1 bit of code. Such setting of field size prevents the error value from becoming too large (i.e. larger than the field size) to be stored in the table. When a secondary error correction table is created as shown in FIG. 8, it is compressed by adjusting the field size so as to conform to the maximum error displacement value of the table. The change of field size is defined by equation (1) below.

Field size before compression=current channel bit number of input color+code bit 1

Field size after compression=bit number of maximum error displacement+code bit 1   (1)

Figure 9:
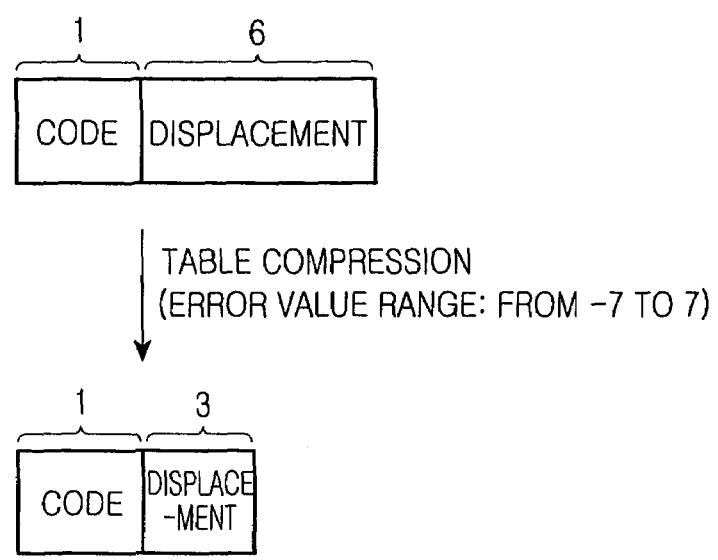
FIG. 9 shows an example of compressing an error correction value during the process shown in FIG. 6.

Illustratively as shown in FIG. 9, when the maximum error displacement of channel G in RGB565 format is 7, the field size of a table of channel G is 7 bit before compression and 4 bit after compression.

Figure 10:
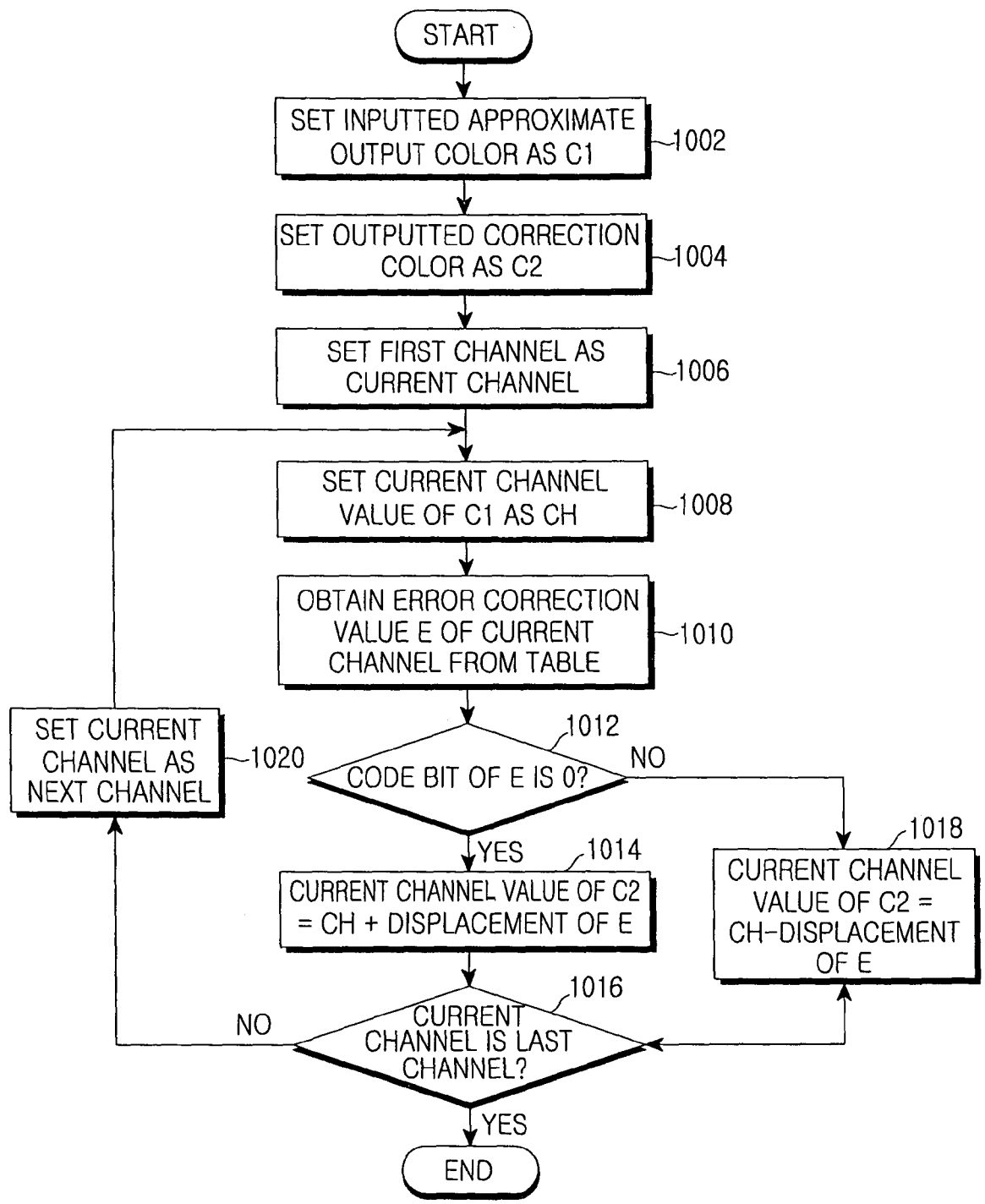
FIG. 10 is a flowchart showing detailed error correction steps during a color conversion operation using an error correction table according to the present invention.

FIG. 10 is a flowchart showing the detailed error correction steps during a color conversion operation using an error correction table according to the present invention. Particularly, these steps are sub-steps of step 262 shown in FIG. 3. Referring to FIG. 10, an inputted approximate output color is set as C1 in step 1002. An outputted correction color is set as C2 in step 1004. The first channel is set as the current channel in step 1006, the current channel value of C1 is set as CH in step 1008. An error correction value E of the current channel is obtained from an error correction table, which has been stored in the processes shown in FIGS. 6 to 8, in step 1010. A checked is performed to determine whether the code bit of E is 0 in step 1012. If so, the flow is directed to step 1014. If not (i.e. when the code bit is 1), the flow is directed to step 1018. In step 1014, the current channel value of C2 is set as CH+displacement of E, then step 1016 follows. In step 1018, the current channel value of C2 is set as CH−displacement of E, then step 1016 follows. In step 1016, a checked is performed to determine whether the current channel is the last channel. If so, the process is terminated. If not, the current channel is set as the next channel in step 1020, and steps starting from step 1008 are repeated.

Via the steps shown in FIG. 10, a value obtained from the error correction table is added to or subtracted from each channel of the approximate output color, so that a final correction output color is obtained.

The above-mentioned color conversion method using an error correction table according to an embodiment of the present invention aims at reducing errors occurring in color conversion techniques. The present invention uses simple approximation by adding a table-based error correction step to a post-processing step. A table storage space of 128K byte is necessary for entire mapping in a 16-bit format. However, comparison between the inventive color conversion method based on an error correction table and a conventional technique using a mapping table for the entire color space conversion shows that the present invention requires only half the table storage space or less, because only the error value needs to be stored.

The color conversion method using an error correction table according to the present invention has a number of advantages. The amount of necessary storage space is reduced to a half or less when compared with conventional conversion techniques using a mapping table for the entire color space. The inventive method supports more precise color conversion than in the case of conversion techniques using simple approximation. The inventive color conversion method is particularly advantageous to a device using 16-bit color format, such as a mobile LCD.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A color conversion method operable in a processor, the method comprising the steps of:
   (a) converting a color represented by a plurality of first color channel values of a first color space, to a plurality of second color channel values of a second color space, using an approximation technique, such that the second color channel values are approximate values representing the color;
   (b) correcting the second color channel values representing the color using a preset, computation based error correction table, wherein the error correction table contains error correction values pre-computed using a conversion algorithm, with each error correction value being determined as a difference between: (i) a second color channel value computed based on an original conversion formula that converts a color represented by the first color space to a color represented by the second color space more accurately than by using the approximation technique, and (ii) a second color channel value computed based on the approximation technique, and represented as a code and an error displacement value, wherein said code is determined based on the color channel based on the original conversion formula and the color channel based on the approximation technique and said error displacement value being an absolute value; and (c) outputting a corrected color obtained by the error correction values;

wherein step (b) comprises the steps of:

creating a primary error correction table by obtaining an error correction value for each channel from a difference between a color channel based on the original conversion formula and a color channel based on the approximation technique; and creating a final error correction table by compressing the primary error correction table; and wherein the primary error correction table is compressed by adjusting a field size to conform to a maximum error displacement value of the primary error correction table.

2. The method as claimed in claim 1, wherein the error correction table stores error correction values for each color channel of a color space.

3. The method as claimed in claim 1 wherein, in step (b), the error of the color is corrected by adding/subtracting said error correction displacement value of a corresponding error correction value to/from each converted color channel value according to the corresponding code.

4. The method as claimed in claim 1 wherein the approximation technique is based on one of: an interpolation using a color lookup table and a polynomial regression equation.

5. The method as claimed in claim 4, wherein the approximation technique is based on the polynomial regression equation.

* * * * *